United States Patent
Hathiramani et al.

(10) Patent No.: US 12,108,379 B2
(45) Date of Patent: Oct. 1, 2024

(54) PDCCH AND CRS OVERLAYING IN TELECOMMUNICATION SYSTEMS

(71) Applicant: Nokia Technologies Oy, Espoo (FI)

(72) Inventors: Navin Hathiramani, Coppell, TX (US); Karri Markus Ranta-Aho, Espoo (FI); Esa Tapani Tiirola, Kempele (FI); Pasi Eino Tapio Kinnunen, Oulu (FI)

(73) Assignee: Nokia Technologies Oy, Espoo (FI)

( * ) Notice: Subject to any disclaimer, the term of this patent is extended or adjusted under 35 U.S.C. 154(b) by 232 days.

(21) Appl. No.: 17/731,428

(22) Filed: Apr. 28, 2022

(65) Prior Publication Data

US 2023/0354290 A1    Nov. 2, 2023

(51) Int. Cl.
*H04W 72/04* (2023.01)
*H04W 72/044* (2023.01)

(52) U.S. Cl.
CPC .............. *H04W 72/0473* (2013.01)

(58) Field of Classification Search
None
See application file for complete search history.

(56) References Cited

U.S. PATENT DOCUMENTS

| | | | |
|---|---|---|---|
| 10,986,648 B2 | 4/2021 | Papasakellariou | |
| 2019/0357264 A1 | 11/2019 | Yi et al. | |
| 2021/0227475 A1 | 7/2021 | Tang et al. | |
| 2022/0103321 A1 | 3/2022 | Huss et al. | |
| 2022/0311576 A1* | 9/2022 | Sun | H04L 5/0091 |
| 2022/0386342 A1* | 12/2022 | Takeda | H04W 72/0446 |
| 2023/0156740 A1 | 5/2023 | Kim et al. | |

FOREIGN PATENT DOCUMENTS

| | | |
|---|---|---|
| WO | 2020/201996 A1 | 10/2020 |
| WO | 2021/201623 A1 | 10/2021 |
| WO | 2021/221403 A1 | 11/2021 |

OTHER PUBLICATIONS

International Search Report and Written Opinion received for corresponding Patent Cooperation Treaty Application No. PCT/EP2023/060427, dated Jul. 14, 2023, 12 pages.
(Continued)

*Primary Examiner* — Kouroush Mohebbi
(74) *Attorney, Agent, or Firm* — Nokia Technologies Oy

(57) ABSTRACT

This disclosure presents processes for improving the quality of NR PDCCH reception at a UE when transmitted in a same orthogonal frequency-division multiplexing (OFDM) symbol and a same frequency domain resource element as an LTE CRS. Using a capability parameter of the UE, a network node can transmit an LTE CRS and NR PDCCH in the same OFDM symbol and the same frequency domain resource elements using various encoding schemes. The encoding schemes can be one or more of puncture signalling, superposition signalling, relative power levels, UE type, adjusting the AL of the LTE CRS, or various combinations thereof. The UE can decode the PDDCH using the encoding scheme. Legacy UEs can be supported with this disclosure by the network node selecting supported UE capabilities for the encoding. The network node can balance transmission reliability with available resources.

20 Claims, 4 Drawing Sheets

(56) References Cited

OTHER PUBLICATIONS

"[eDSS] RRC configuration and UE capability for PDCCH on CRS", 3GPP TSG RAN WG1 #110bis-e, R1-2210193, Agenda: 9.17, Nokia, Oct. 10-19, 2022, 4 pages.
"Extension of the Dynamic Spectrum Sharing (DSS) WID", 3GPP TSG RAN WG1 #102, R1-2006470, Agenda: 8.14, Nokia, Aug. 17-28, 2020, 5 pages.
"3rd Generation Partnership Project; Technical Specification Group Radio Access Network; NR; Physical layer procedures for control (Release 17)", 3GPP TS 38.213, V17.0.0, Dec. 2021, pp. 1-225.
"3rd Generation Partnership Project; Technical Specification Group Radio Access Network; NR; Radio Resource Control (RRC) protocol specification (Release 16)", 3GPP TS 38.331, V16.7.0, Dec. 2021, pp. 1-963.
"New WI: Enhancement of NR Dynamic spectrum sharing (DSS)", 3GPP TSG RAN Meeting #94e, RP-213575, Agenda: 8A.1, Ericsson, Dec. 6-17, 2021, 4 pages.
Yang et al., "Group-Wise Listen-Before-Talk Protocol for Dynamic Spectrum Sharing: A New Framework for Full Frequency Reuse", IEEE Access, vol. 8, Mar. 5, 2020, pp. 47021-47033.

\* cited by examiner

FIG. 2

PDCCH AND CRS OVERLAYING IN TELECOMMUNICATION SYSTEMS

TECHNICAL FIELD

This application is directed, in general, to LTE CRS signals and NR PDCCH and, more specifically, for communicating signals when there is potential collision of their transmission resources.

BACKGROUND

During development of the 3GPP Rel 15 specification, an indication of the LTE-CRS rate matching pattern via the NR DSS Cell System Information was discussed, however there was no agreement to support idle mode CRS rate matching, and subsequently rate matching in connected mode only, and for PDSCH only was specified. Current 3GPP specifications do not allow for NR PDCCH to overlap with LTE CRS, e.g., from 3GPP TS 38.213 "If at least one RE of a PDCCH candidate for a UE on the serving cell overlaps with at least one RE of LTE-CRS-ToMatchAround, or of LTE-CRS-PatternList, the UE is not required to monitor the PDCCH candidate." 3GPP has agreed to study an item for the Rel 18 specification to soften the restriction to enable higher NR PDCCH capacity, e.g., work order item RP-213575.

SUMMARY

In one aspect, an apparatus is disclosed. In one embodiment, the apparatus includes (1) one or more processors, and (2) memory storing instructions and data that, when executed by the one or more processors, cause the apparatus to: (1) receive one or more of a long-term evolution (LTE) cell-specific reference signal (CRS) or a new radio (NR) physical downlink control channel (PDCCH) from a network node, and (2) decode the NR PDCCH utilizing a puncture threshold and an aggregation level (AL), where the puncture threshold indicates one or more of a puncture signalling, a superposition signalling, or a NR PDCCH relative power level, wherein, when the NR PDCCH relative power level is used, the NR PDCCH relative power level is received in a previous signal.

In a second aspect, an apparatus is disclosed. In one embodiment, the apparatus includes (1) one or more processors, and (2) memory storing instructions and data that, when executed by the one or more processors, cause the apparatus to: (1) determine a puncture threshold of a NR PDCCH to a UE, wherein the puncture threshold includes an AL for the NR PDCCH, for when the apparatus is scheduled to transmit a LTE CRS within a same orthogonal frequency-division multiplexing (OFDM) symbol and a same frequency domain resource element as the NR PDCCH, and (2) transmit the NR PDCCH to the UE, wherein the NR PDCCH is composed using the puncture threshold.

In a third aspect, a method is disclosed. In one embodiment, the method includes (1) receiving a capability parameter of a UE, wherein the capability parameter indicates whether the UE supports puncture signalling of a LTE CRS with a NR PDCCH, (2) determining a puncture threshold of the NR PDCCH utilizing the capability parameter, wherein the puncture threshold includes an AL for the PDCCH, and the LTE CRS is scheduled to be transmitted within a same OFDM symbol and a same frequency domain resource element as the NR PDCCH, (3) transmitting the LTE CRS and the NR PDCCH to the UE using the puncture threshold, and (4) receiving at the UE, the LTE CRS and NR PDCCH.

In a fourth aspect, a communication system is disclosed. In one embodiment, the communication system includes (1) a network node, capable to transceive communications with one or more UEs, wherein the communications include a LTE CRS and a NR PDCCH, and the LTE CRS and NR PDCCH are transmitted using one of a puncture signalling, superposition signalling, or drop signalling, where the LTE CRS is transmitted within a same OFDM symbol and a same frequency domain resource element as the NR PDCCH, and (2) a UE, in the one or more UEs, capable to transceiver the communications with the network node, wherein the UE transmits a capability parameter to the network node, the UE receives a puncture threshold from the network node, and the UE processes the LTE CRS and decodes the NR PDCCH using the puncture threshold.

BRIEF DESCRIPTION

Reference is now made to the following descriptions taken in conjunction with the accompanying drawings, in which:

FIG. 2 is an illustration of a diagram of an example chart of puncture signalling and superposition signalling;

DETAILED DESCRIPTION

Figure 1:
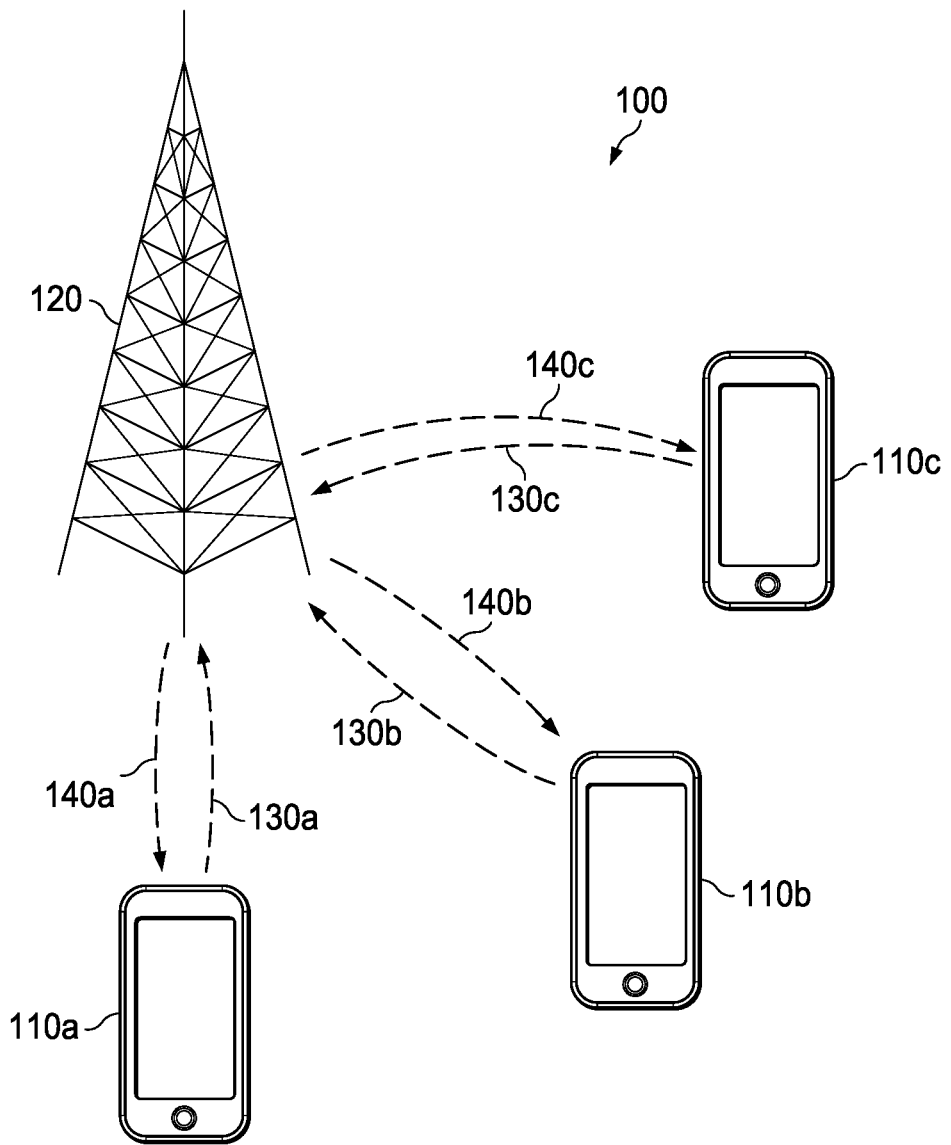
FIG. 1 is an illustration of a diagram of an example communication scenario with a network node and multiple user equipment (UEs)

In the fifth generation (5G) third-generation partnership project (3GPP) Release 18 (Rel 18) proposed standard, there is a work item (WI) published for December 2022 RAN #94 labeled as RP-21375. The objectives of the 3GPP Rel 18 dynamic spectrum sharing (DSS) WI are stated as (1) Study and, if needed, specify new radio (NR) physical downlink control channel (PDCCH) reception in symbols with long-term evolution (LTE) cell-specific reference signal (CRS) resource elements (REs) [RAN1], (2) Investigate enabling LTE CRS to puncture NR PDCCH, including the impact to NR PDCCH demodulation reference signal (DMRS) if there is the performance gain from the additional PDCCH resources, and (3) Allow a user equipment (UE) to support, and be configured with, two overlapping CRS rate matching patterns regardless of support or configuration of multi-transmission reception points (TRP) [RAN1, RAN2]. The WI is scheduled to span over two RAN1 meetings, May and August 2022. The accepted solutions for this study item can be reflected in various 3GPP specifications.

In a communication network, a UE can establish a communication connection with a network node. UEs, such as mobile phones, tablets, laptops, vehicles, ships, trains, satellites, balloons, airplanes, space vehicles, and other 5G devices whether movable, mobile, or stationary, can establish a communication link with one or more network nodes, i.e., network devices. The network node can implement a communication node, such as a radio access network (RAN) such as a 5G base station (gNB), an evolved universal mobile telecommunications system (UMTS), a terrestrial radio access (E-UTRA), an enhanced 4G eNodeB E-UTRA base station (eNB), e.g., an enhanced Node B, an enhanced gNB (en-gNB), or a next generation eNB (ng-eNB). The network node can be implemented using various terrestrial or non-terrestrial systems, such as, ground-based systems, balloons, airplanes, satellites, spaceships, and other non-terrestrial based systems. Network nodes can be, for example, a low earth orbit (LEO) satellite, a medium earth orbit (MEO) satellite, a geosynchronous earth orbit (GEO) satellite, a high altitude platform station (HAPS), an unmanned aerial vehicle (UAV), an unmanned aircraft system (UAS), or other types of platforms or vehicles.

When deploying previous 4G or 5G dynamic spectrum sharing (DSS) schemes, one of the underlying principles was to minimize the impact to the legacy LTE network. This led to DSS deployments in low bands where NR had very limited PDCCH resources. This deficiency was also tackled in Rel 17 WI of Cross Carrier Scheduling from a SCell to PCell. Cross carrier scheduling can be a complex feature and the probability of it being adopted by the ecosystem seems low, at least for DSS use cases. Cross carrier scheduling can require separate UE capability on top of carrier aggregation features.

Typically, in DSS, NR is configured to operate with 15 kiloHertz (kHz) subcarrier spacing (SCS), i.e., the same SCS used by LTE). Another convention that is typically used is that the LTE subframe and the NR subframe (e.g., respective slots) are aligned in time and frequency. The current 3GPP specifications do not allow for NR PDCCH to overlap with LTE CRS. PDCCH monitoring occasions defined by monitoringSymbolsWithinSlot (in IE SearchSpace, TS 38.331) cannot overlap with LTE CRS. For example, when LTE has a 4-port CRS configured, there can be 12 symbols per physical resource block (PRB) available for NR PDCCH. It is an optional feature for a UE to monitor PDCCH in a symbol of a slot. This corresponds to operations according to Feature Group (FG) 3-5), while FG 3-1 where PDCCH monitoring is constrained in the first 3 symbols of the slot is supported by UEs. With a 4-port CRS configuration, there would be one symbol available for PDCCH. Hence, the PDCCH capacity is a bottleneck for DSS deployments.

This disclosure presents processes to enable a transmission of LTE CRS and NR PDCCH during the same orthogonal frequency-division multiplexing (OFDM) symbol and the same frequency domain resource elements. The transmission can be encoded (composed) using superposition signalling of the NR PDCCH on the LTE CRS (that is, both are transmitted, and the NR UE interested in NR PDCCH experiences LTE CRS as interference, and the LTE UE interested in LTE CRS experiences the overlapping NR PDCCH REs as interference), or puncture the NR PDCCH REs overlapping with the LTE CRS (NR PDCCH transmission would not use the REs that overlap with the LTE CRS and hence the NR UE would not employ these overlapping symbols in the NR PDCCH demodulation/decoding). The operation used by the UE can be a function of the aggregation level (AL) of the PDCCH candidate or PDSCH candidate being processed. Simulations have shown that with low ALs the PDCCH superposition signalling is less effective, therefore puncture signalling can be the preferred process. For higher ALs, superposition signalling can outperform puncture signalling. The cross-over point between puncture signalling and superposition signalling can depend on the relative transmission (Tx) powers of the NR PDCCH and the LTE CRS as well as the targeted PDCCH block error rate (BLER) operating point. This disclosure can relate to DSS features. Spectrum sharing implies multiple radio access technology shares the same spectrum. In the demonstration scenarios presented herein, the two radio access technologies sharing the same spectrum are LTE and NR. Dynamic means that channel allocation is not static and varies in time or frequency, e.g., from a subframe or slot to another.

In some aspects, the gNB (i.e., one of various types of network nodes) can configure the UE, in addition to the LTE CRS patterns, with information on which PDCCH candidate ALs the UE can assume that the NR PDCCH is to be punctured on the REs overlapping with LTE CRS, and which ALs are not punctured. This aspect is part of the PDCCH detection where the UE decodes each PDCCH candidate with predefined control channel elements (CCEs). Different PDCCH candidates can have a predefined starting CCE and occupy a predefined number of consecutive CCEs defined by the AL. Two different UE types can be employed, (1) UEs that support puncture signalling the NR PDCCH to make room for the LTE CRS, such as Rel-18 UEs, and (2) UEs that do not support puncture signalling the PDCCH, such as legacy UEs and newer UEs that do not support the capability.

In some aspects, the gNB can schedule the legacy UEs with higher ALs and avoid using low ALs when the PDCCH overlaps with the CRS. With legacy UEs, this can be possible if the LTE CRS configuration is not provided to the UE, or when the CRS configuration does not tell the UE that there are CRS REs overlapping with PDCCH.

In some aspects, the gNB can schedule the newer UEs that do not support the puncture decoding capability, or with puncture decoding capability configured in the operational mode. The scheduling can be done the same way as the legacy UEs while the newer UEs would know that the low ALs (according to configuration) will not be used when the PDCCH candidate overlaps with LTE CRS, and that blind decode can be skipped (e.g., NR PDCCH skipping), leaving the blind decode budget for other ALs. In some aspects, the newer UEs would accept an LTE CRS pattern configuration that leads to PDCCH overlapping with LTE CRS, which is a scenario that the legacy UEs are not expected to accept.

In some aspects, the gNB can freely select the AL to use for the new UE with puncture decoding support. For example, for each search space, the gNB can configure the number of PDCCH candidates per AL that the UE should monitor, at the predefined PDCCH monitoring occasions. This can be configured by the SearchSpace information element as described in TS 38.331.

When decoding low AL PDCCH candidates (where low AL is relative to the equipment used and the power of each signal), the UE can use puncture decoding and would not assume that the NR PDCCHs are present on the REs overlapping with the LTE CRS REs. When decoding higher AL PDCCH, the UE would not use puncture decoding, while in some aspects, the UE can use CRS interference suppression.

In some aspects, at least the NR UE can be configured with relative power levels of the superpositioned REs so that the UE knows the LTE CRS interference power relative to the NR PDCCH or PDCCH DMRS REs when the two land on the same resource element. The configuration can indicate NR PDCCH are higher powered than LTE CRS, equivalently powered, or lower powered down to negative infinity (where the power is measured in decibels (dB)), which would correspond to puncture signalling the NR PDCCH or PDCCH DMRS REs that collide with the LTE CRS (e.g., a puncture threshold specifies a DMRS to LTE CRS collision parameter). The NR UE can be made aware of the relative power of the PDCCH or PDCCH DMRS REs that do not collide with the LTE CRS.

In some aspects, the gNB does not puncture the NR PDCCH and the UE would use its knowledge of the superimposed signals and their relative power when the UE expects that to yield better performance. For example, the gNB can transmit the PDCCH REs on the LTE CRS, and the UE can ignore them. The gNB does not know when the UE will use or ignore the REs. In a specific example, a UE capable of suppressing CRS interference could use the super-imposed REs on a particular AL with a given PDCCH/CRS power ratio while another UE not capable of CRS interference suppression would use puncture decoding under the same conditions.

In some aspects, a set of reference UE types can be specified, e.g., CRS interference suppression capable, or non-capable of CRS interference suppression, and the UE type would be provided to the gNB as a UE capability parameter. This capability can inform at what ALs with a given NR to LTE CRS power ratio that puncture signalling will be used. This can allow the gNB to not transmit the PDCCH REs that the UE would not use in the decoding process. In some aspects, UE's puncture decoding versus no puncture decoding behaviour can be negotiated bilaterally, and the gNB would know after a UE type detection (using a capability parameter) under what scenarios the UE will apply puncture decoding to the signalling.

Therefore, in some aspects, the network node can adjust the NR PDCCH power (e.g., set a NR PDCCH relative power level) to obtain a balance between how much the LTE CRS is interfered with by the NR PDCCH, and how much the NR PDCCH performance is improved (relative to puncture decoding), such as using a performance parameter. Operators can be expected to be concerned about the impact to LTE performance due to CRS interference in basic scenarios. In networks where LTE traffic is low and NR device penetration is high, operators can incorporate more signal balancing to emphasize the NR PDCCH capacity and performance at the expense of higher LTE CRS interference when overlapped with a PDCCH transmission. The UE knows the power difference of the clean PDCCH symbols and interfered PDCCH symbols as well as the amount of LTE CRS interference on the interfered symbols and can utilize this in the receive processing for optimal decoding performance.

In some aspects, the UE demod performance requirements can be defined separately for different DSS superposition signalling scenarios, e.g., for different power levels and different collision scenarios. Some of the aspects disclosed can include various combinations of the following: (1) a superposition signalling of downlink (DL) control signals, (2) a superposition signalling versus puncture signalling of the PDCCH REs as a function of PDCCH AL, (3) a superposition signalling versus dropping a PDCCH candidate (for UEs not supporting puncture signalling) depending on the AL, if the candidate overlaps with LTE CRS, (4) a power control-based scheme to mitigate interference from one radio access technology (RAT) to another based on various factors, such as connected UEs and their radio conditions, (5) a network node UE channel estimation biasing based on power control of another node's control signals, and (6) an indication of superposition signalling and power of the interference versus a desired signal to UE for channel estimation and decoding purposes.

In some aspects, the following, or variations thereof, can be utilized within a 3GPP standard, where a NR UE configured with LTE CRS pattern shall (1) Not attempt to decode an PDCCH candidate of a specific AL, depending on the RRC configuration, if that PDCCH candidate overlaps with LTE CRS REs, for example, a newer UE that does not support puncture signalling, and (2) Not use the REs (puncture the REs) overlapping with LTE CRS REs when decoding an PDCCH or PDSCH candidate of a specific AL, depending on the RRC configuration, if that PDCCH candidate overlaps with LTE CRS REs, for example, a newer UE that supports puncture signalling. An example, for demonstration purposes, of the messaging changes to the 3GPP standard are shown in Table 1. Other messaging changes and different messaging changes can be utilized to implement this disclosure; Table 1 is for example.

TABLE 1

Example messaging to support puncture signalling

| Message | Change |
| --- | --- |
| Message: PDCCH, RRCReconfiguration | Network node sends signalling scheme. Network node sends PDCCH/CRS power level ratio. |
| Message: RRCReconfiguration | UE provides capability parameters (support of puncturing, support for variable power levels, preferred aggregation levels for various power levels) |

In some aspects, coexistence with legacy UEs can be supported, such as UEs that do not support configurations where PDCCH overlaps with LTE CRS. Conventionally, the current 3GPP specifications do not support PDCCH candidates that overlap with an LTE CRS RE. In some aspects, support for this overlap can be extended to the existing device base with software upgrades, prior to release of the Rel 18 standard for UEs that do not support PDCCH puncturing and support superposition signalling, e.g., the UE can accept a configuration where NR PDCCH candidates map on LTE CRS REs and attempts to decode the PDCCH candidates. In aspects where support for this disclosure is attempted prior to Rel-18, legacy UE devices can be tested or verified that they can support the disclosed solutions. For example, a solution can be worked out through interoperability device testing (IoDT), where a UE vendor can disclose bilaterally that a particular UE type supports the configuration and will attempt to decode such PDCCH candidates. These tested or verified UEs can be identified through UE capability parameters or a repurposed UE capability indicator that has been marked as obsolete.

In some aspects, where a coexistence with legacy UEs that do not support configurations of PDCCH overlap with LTE CRS, the following processes can be applied. In some aspects, idle mode UEs may not know of LTE CRS presence, so these UEs can attempt to decode a PDCCH candidate even if it overlaps with LTE CRS. This operational mode can be equivalent to no-puncture signalling with no attempt by the UE receiver to mitigate the CRS presence as the UE would not be able suppress the CRS interference or avoid the CRS-contaminated DMRS REs in channel estimation. This aspect can be used for connected-mode legacy UEs, though the operational mode may not be able to improve PDCCH or PDSCH performance from LTE CRS rate-matching.

In some aspects, when PDCCH precoder granularity is not set to contiguous resource blocks (RBs), the UE can accept the configuration, and drop the PDCCH candidate that overlaps with LTE CRS. With this configuration, the gNB can avoid those PDCCH candidates that have overlapping REs. This aspect may have limitations since PDCCH candidates are dropped from transmission.

In some aspects, legacy UEs can be configured with 2-port LTE CRS to rate-match around even if the present LTE CRS is 4-port. This can degrade the PDCCH or PDSCH performance on the REs that overlap with the CRS ports #2 and #3. However, there would be one more symbol available for PDCCH monitoring if there was LTE CRS REs in that symbol. In some aspects, the legacy UEs can be operated as done conventionally, such that they can be configured with a narrow control resource set (CORESET) and would therefore suffer from low PDCCH capacity.

If an NR DSS cell is permitted to transmit NR PDCCH on REs overlapping LTE CRS, this can impact legacy LTE UE channel estimation, timing/frequency synchronization, and measurements. In the 4 port LTE CRS case with 2 NR PDCCH symbols there are 4 LTE CRS RE's impacted per physical RB out of a total of 8 for port 2 and 3. Interference on ports 2 and 3 may not impact idle mode LTE UE's traffic performance, and as the mobility measurements are not supposed to use CRS of ports #2 and #3 either, there should be no impact on idle mode or connected mode mobility. The LTE and NR networks can operate on the same licensed band on the same carrier frequency on the same geographical location, i.e., they belong to the same network operator that can control which radio technology it wants to prioritize on the carrier.

The proposed processes can enable legacy NR UEs to operate with a minor change, e.g., monitor search spaces overlapping with LTE CRS. Legacy UEs in a DSS cell may not be aware of the presence of LTE CRS on a NR DSS cell until after entering connected mode, hence CORESET0 can be at least initially monitored by legacy UEs regardless of the presence of overlapping LTE CRS. After entering connected mode, the UE implementation determines whether to further monitor these search spaces.

In some aspects, to further improve the performance of NR UEs in the DSS scenarios with LTE CRS overlapping PDCCH resources, the NR UE can be informed of the presence of overlapping resources. The NR UE can be, for example, informed of the RE's overlapping with the CORESET and a parameter indicative of the LTE CRS power with respect to the NR PDCCH. This information can be provided semi-statically to the UE on an AL basis, e.g., different relative powers per AL. Using this information, the NR UE can change its PDCCH monitoring behaviour, such as not dropping PDCCHs, and apply the information to modify its receiver, channel estimation, or PDCCH decoding algorithms. For example, the PDCCH receiver can modify its channel estimation principles to (1) perform channel estimation from clean symbols (2) perform channel estimation from the symbols, or (3) perform channel estimation from DMRS that do not have CRS superposition signalling.

This disclosure can allow a UE vendor to minimize UE complexity for Rel-18 DSS features, e.g., no puncturing for LTE CRS in channel estimation of the NR PDCCH. Legacy UE platforms can benefit from this framework via a simple change. Solutions such as puncture signalling would not be beneficial for pre Rel-18 UEs and hence not solve the PDCCH bottleneck as easily. Network operators can (1) increase PDCCH capacity while minimizing complex configurations, (2) reduced implementation barriers for Rel-18 DSS features, or (3) have additional tools for balancing LTE and NR performance.

Turning now to the figures, FIG. 1 is an illustration of a diagram of an example communication scenario 100 with a network node and multiple UEs. Communication scenario 100 is a demonstration of one type of environment for this disclosure. The environment for communication scenario 100 includes a UE 110a, a UE 110b, a UE 110c (collectively, UEs 110), and a network node 120. There can be fewer or additional UEs in UEs 110. Network node 120 can be a gNB or other type of communication node.

An example set of messages are shown in communication scenario 100. At a registration time, a time of a configuration change, or upon messaging request of UE 110a, UE 110a can send a message 130a to network node 120 with a configuration parameter of UE 110a. Message 130a can include one or more configuration parameters, such as support for puncture signalling or support for relative power ratios. Likewise, UE 110b can send its configuration parameter through message 130b and UE 110c can send its configuration parameter through message 130c, (collectively, messages 130). Messages 130 can be various messages or a response to a PDCCH or PDSCH message.

In some example aspects, network node 120 can determine whether to use puncture signalling or superposition signalling for future PDCCHs. In some example aspects, the network node 120 can determine whether to use a NR PDCCH relative power level to reduce signal interference. The PDCCH, and LTE CRS, can be transmitted to the UEs 110 using the message 140a for UE 110a, message 140b for 110b, and message 140c for 110c (collectively, messages 140), such as using puncture signalling or superposition signalling. Each UE in UEs 110 can utilize a different transmission scheme. In some example aspects, messages 140 can be received and the respective UEs 110 can adjust their respective decoding schemes for subsequent PDCCHs.

Figure 2:
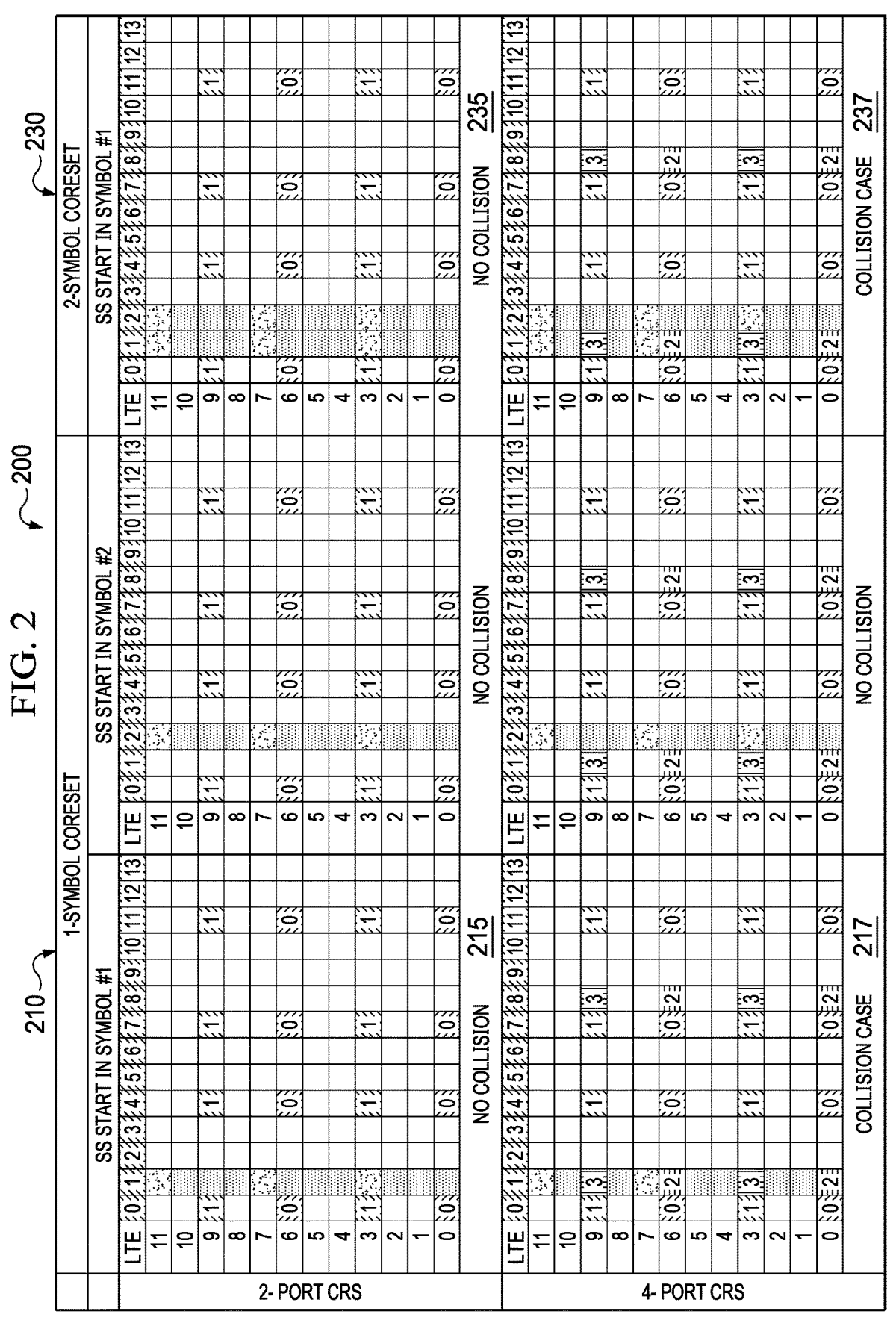

FIG. 2 is an illustration of a diagram of an example chart 200 of puncture signalling and superposition signalling. Chart 200 provides a depiction of some of the different NR PDCCH configurations in an LTE slot. Chart 200 has two sections, a 1-symbol CORESET 210 and a 2-symbol CORESET 230. Two collision scenarios are depicted in chart 200. Signal transmission 215 utilizes a 2-port CRS and shows that there is no collision in symbol slot 1. Signal transmission 217 shows that in a 4-port CRS, there can be symbol interference in symbol slot 2, therefore a puncture or superposition signalling would be used. Signal transmission 235 uses a 2-port CRS and shows that there is no collision in symbol slot 2 or symbol slot 3. Signal transmission 237 utilizes a 4-port CRS and shows interference is possible for symbols in slot 2, while symbol slot 3 does not have a collision. In symbols where collisions occur, there is one NR PDCCH DMRS and three NR PDCCH data RE's impacted per PRB.

Figure 3:
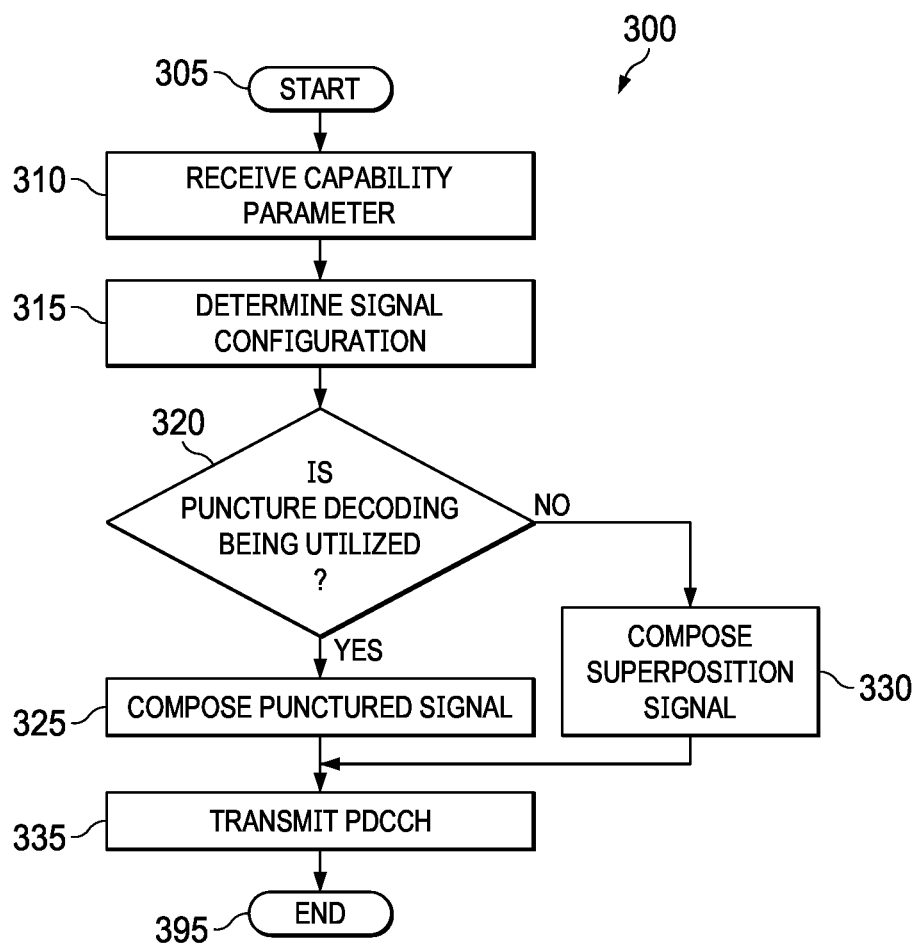
FIG. 3 is an illustration of a flow diagram of an example method to determine puncture or superposition signalling.

FIG. 3 is an illustration of a flow diagram of an example method 300 to determine puncture or superposition signalling. Method 300 can be performed on a computing system, for example, network node 120 of communication scenario 100 of FIG. 1, communication system 400 of FIG. 4, or signal controller 500 of FIG. 5. Method 300 can be performed by a UE, a network node, or partially by a UE and partially by a network node. In some example aspects, a signal configuration, e.g., a puncture threshold, can be received by the UE from the network node. In some aspects, the puncture threshold can be configured by higher layer signalling. In some example aspects, a configuration parameter can be received by the network node. Method 300 can be encapsulated in software code or in hardware, for example, an application, code library, dynamic link library, module, function, RAM, ROM, and other software and hardware implementations. The software can be stored in a file, database, or other computing system storage mechanism. Method 300 can be partially implemented in software and partially in hardware. Method 300 can perform the steps for the described processes, for example, determining whether to transmit a PDCCH or PDSCH using puncture signalling, superposition signalling, or to use a relative power level.

Method 300 starts at a step 305 and proceeds to a step 310. In step 310, the network node can receive a capability parameter from a connected UE. The capability parameter can specify whether the UE supports puncture signalling, supports superposition signalling, or supports relative power ratio levels. In some aspects, the capability parameter can specify preferred AL levels to aid the network node in determining which signalling scheme to utilize. In some aspects, the capability parameter can specify a type of UE or capability of the UE so that the network node can estimate the UE capabilities when determining the transmission scheme for the PDCCH. Step 310 can be optional, in which scenario, the network node can estimate the transmission scheme using other factors, such as available resources. In some aspects, the gNB can determine the UE capability implicitly utilizing other signalling received.

In a step 315, the network node determines a signalling scheme to utilize for a PDCCH. FIG. 3 illustrates NR PDCCH transmission and does not specifically show the overlapping LTE CRS transmission. The signalling scheme selected utilizes what is shown and other information, such as the LTE CRS transmissions. In some aspects, the network node can specify that a NR PDCCH relative power level will used for subsequent PDCCHs. In a decision step 320, if puncture signalling is being utilized for the PDCCH then the resultant is "Yes" and then method 300 proceeds to a step 325. If the resultant is "No", then method 300 proceeds to a step 330.

In step 325, the network node composes the PDCCH using puncture signalling scheme, and the transmission includes the LTE CRS information, for example, a number of CRS ports, cell identification, and other parameters. Method 300 proceeds to a step 335. In step 330, the network node composes the PDCCH using superposition signalling, and the transmission includes the LTE CRS information. For example, a power level used for LTE CRS transmission, and in some aspects other parameters, such as a number of CRS ports, a cell identification, or other LTE CRS parameters. In some aspects, the network node can alter the power level used for the NR portion of the signal according to a previously determined NR PDCCH relative power level, e.g., a power level ratio of NR to LTE CRS. The ratio can indicate the NR PDCCH relative power level is at a higher power level, a lower power level, or an equal power level as compared to the LTE CRS. Method 300 proceeds to step 335.

In step 335, the network node transmits the PDCCH using the appropriate scheme. The UE receives the PDCCH and decodes the signal accordingly. Method 300 ends at a step 395.

Figure 4:
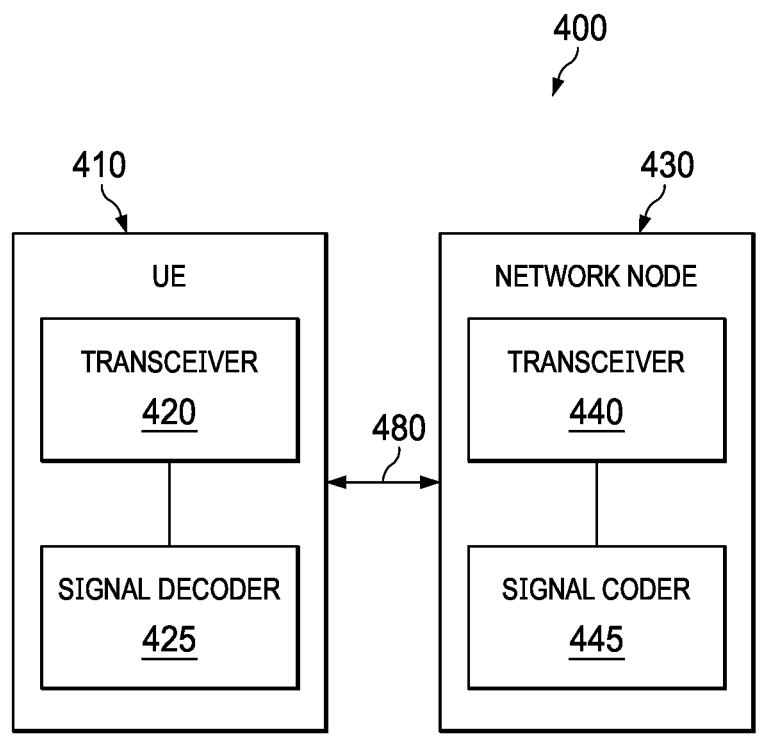
FIG. 4 is an illustration of a block diagram of an example communication system.

FIG. 4 is an illustration of a block diagram of an example communication system 400. Communication system 400 is an example system and could have additional network nodes and additional UEs. Communication system 400 can implement the disclosed solutions, such as method 300 of FIG. 3 and implement the signal controller 500 of FIG. 5. Communication system 400 has a UE 410 and a network node 430.

UE 410 has a transceiver 420 capable of receiving communication signals and transmitting communication signals with network node 430 using a signal connection 480, for example, receiving signal configuration (for example, a puncture threshold) from network node 430, or sending a configuration parameter. UE 410 has a signal decoder 425, which can determine how UE 410 utilizes the received signal configuration to decode the PDCCH.

Network node 430 has a transceiver 440 capable of receiving communication signals and transmitting communication signals with UE 410 using signal connection 480. Network node 430 has a signal coder 445 that is capable of analyzing the received UE configuration parameter (in aspects where the configuration parameter is received), and is capable of encoding a PDCCH using one or more of the schemes described herein. In some aspects, the configuration parameter is not sent by UE 410 and network node 430 utilizes a decision algorithm to determine the transmission scheme to utilize, such as performing an estimation using the known factors of UE 410, such as a model or type of UE. Network node 430 can communicate the PDCCH to UE 410 using one of the described schemes herein.

The elements of UE 410 and network node 430 are shown as a functional view, where the implementation can be by software, hardware, or a combination thereof. In some aspects, the functions shown can be combined with other functions of the respective UE 410 or network node 430.

Figure 5:
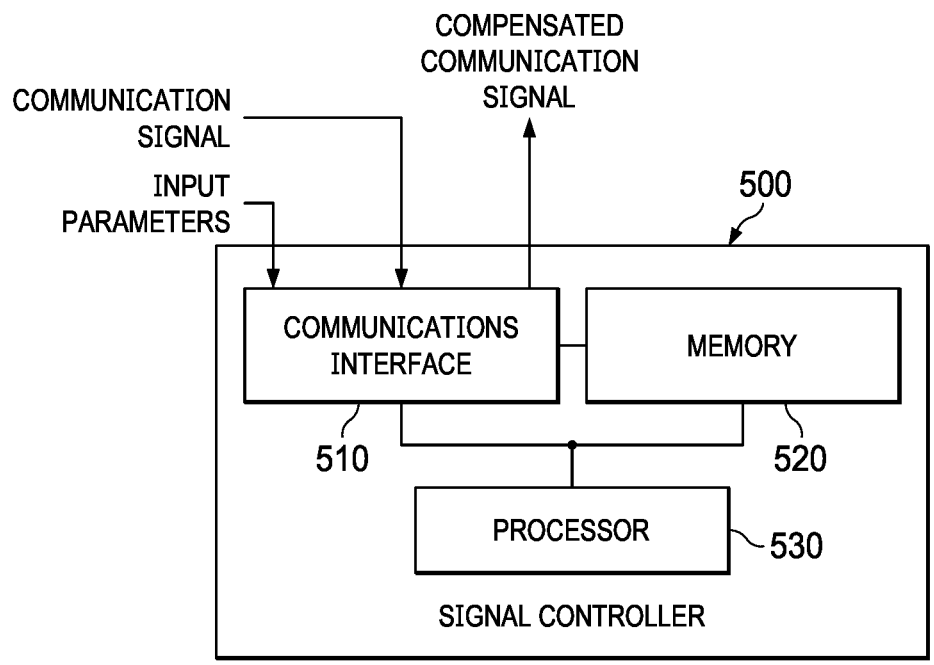
FIG. 5 is an illustration of a block diagram of an example of a signal controller according to the principles of the disclosure.

FIG. 5 is an illustration of a block diagram of an example of a signal controller 500 according to the principles of the disclosure. Signal controller 500 can be stored on a single computer or on multiple computers. The various components of signal controller 500 can communicate via wireless or wired conventional connections. In some aspects, a portion or a whole of signal controller 500 can be located as part of a UE and other portions of signal controller 500 can be located as part of a network node communicating with the UE. In some aspects, a whole of signal controller 500 can be implemented in a network node. Signal controller 500 can be virtual or partially virtual while hosted on another system or process.

Signal controller 500 can be configured to perform the various functions disclosed herein including receiving UE configuration parameters. The various functions performed can be an execution of the methods and processes described herein, such as method 300 of FIG. 3. Signal controller 500 can implement communication system 400 of FIG. 4. Signal controller 500 includes a communications interface 510, a memory 520, and a processor 530.

Communications interface 510 is configured to transmit and receive data. For example, communications interface 510 can receive the configuration parameters from a UE. Communications interface 510 can transmit the PDCCH or PDSCH. Communications interface 510 can communicate via communication systems used in the industry. For example, wireless or wired protocols can be used. Communication interface 510 is capable of performing the operations as described for transceiver 420 or transceiver 440 of FIG. 4.

Memory 520 can be configured to store a series of operating instructions and data, e.g., storing instructions and data, that direct the operation of processor 530 when initiated, including the code representing the methods for determining a transmission scheme for a PDCCH or PDSCH. Memory 520 is a non-transitory computer readable medium. Multiple types of memory can be used for data storage and memory 520 can be distributed.

Processor 530 can be configured to determine the appropriate method for encoding a combination of NR and LTE CRS signals. For example, processor 530 can determine whether the signals will be encoded, e.g., composed, using puncture signalling, superposition signalling, relative power ratio levels, or a combination thereof. Processor 530 can be configured to direct the operation of the signal controller 500. Processor 530 includes the logic to communicate with communications interface 510 and memory 520, and perform the functions described herein. Processor 530 is capable of performing or directing the operations as described by signal decoder 425 or signal coder 445 of FIG. 4.

A portion of the above-described apparatus, systems or methods may be embodied in or performed by various analog or digital data processors, wherein the processors are programmed or store executable programs of sequences of software instructions to perform one or more of the steps of the methods. A processor may be, for example, a programmable logic device such as a programmable array logic (PAL), a generic array logic (GAL), a field programmable gate arrays (FPGA), or another type of computer processing device (CPD). The software instructions of such programs may represent schemes and be encoded in machine-executable form on non-transitory digital data storage media, e.g., magnetic or optical disks, random-access memory (RAM), magnetic hard disks, flash memories, or read-only memory (ROM), to enable various types of digital data processors or computers to perform one, multiple, or all of the steps of one or more of the above-described methods, or functions, systems or apparatuses described herein.

Portions of disclosed examples or embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floppy disks; and hardware devices that are specially configured to store and execute program code, such as ROM and RAM devices. Examples of program code include machine code, such as produced by a compiler, and files containing higher level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions, and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

Aspects disclosed herein, as described in the SUMMARY section, include:

A. An apparatus, including (1) one or more processors, and (2) memory storing instructions and data that, when executed by the one or more processors, cause the apparatus to: (1) receive one or more of a LTE CRS or a NR PDCCH from a network node, and (2) decode the NR PDCCH utilizing a puncture threshold and an AL, where the puncture threshold indicates one or more of a puncture signalling, a superposition signalling, or a NR PDCCH relative power level, wherein, when the NR PDCCH relative power level is used, the NR PDCCH relative power level is received in a previous signal.

B. An apparatus, including (1) one or more processors, and (2) memory storing instructions and data that, when executed by the one or more processors, cause the apparatus to: (1) determine a puncture threshold of a NR PDCCH to a UE, wherein the puncture threshold includes an AL for the NR PDCCH, for when the apparatus is scheduled to transmit a LTE CRS within a same OFDM symbol and a same frequency domain resource element as the NR PDCCH, and (2) transmit the NR PDCCH to the UE, wherein the NR PDCCH is composed using the puncture threshold.

C. A method, including (1) receiving a capability parameter of a UE, wherein the capability parameter indicates whether the UE supports puncture signalling of a LTE CRS with a NR PDCCH, (2) determining a puncture threshold of the NR PDCCH utilizing the capability parameter, wherein the puncture threshold includes an AL for the PDCCH, and the LTE CRS is scheduled to be transmitted within a same OFDM symbol and a same frequency domain resource element as the NR PDCCH, (3) transmitting the LTE CRS and the NR PDCCH to the UE using the puncture threshold, and (4) receiving at the UE, the LTE CRS and NR PDCCH.

D. A communication system, including (1) a network node, capable to transceive communications with one or more UEs, wherein the communications include a LTE CRS and a NR PDCCH, and the LTE CRS and NR PDCCH are transmitted using one of a puncture signalling, superposition signalling, or drop signalling, where the LTE CRS is transmitted within a same OFDM symbol and a same frequency domain resource element as the NR PDCCH, and (2) a UE, in the one or more UEs, capable to transceiver the communications with the network node, wherein the UE transmits a capability parameter to the network node, the UE receives a puncture threshold from the network node, and the UE processes the LTE CRS and decodes the NR PDCCH using the puncture threshold.

Each of the aspects as described in the aspects A, B, C, and D above can have one or more of the following additional elements in combination. Element 1: wherein the apparatus does NR PDCCH skipping for the NR PDCCH with the AL indicated as using the puncture signalling when the NR PDCCH overlaps with the LTE CRS and the apparatus does not support puncture signalling. Element 2: transmit a capability parameter to the network node prior to receiving the one or more of the LTE CRS or the NR PDCCH, wherein the capability parameter includes one or more parameters to decode signals using relative power levels. Element 3: receive the puncture threshold prior to the receive the NR PDCCH, wherein the NR PDCCH relative power level indicates the NR PDCCH is at a higher power level than the LTE CRS, at a lower power level than the LTE CRS, or at an equal power level to that of the LTE CRS, and the NR PDCCH relative power level is utilized to decode the NR PDCCH. Element 4: wherein the NR PDCCH relative power level is in a specified dB range. Element 5: wherein the puncture threshold utilizes the NR PDCCH relative power level and the superposition signalling, where the AL is equal to or less than the puncture threshold. Element 6: wherein the puncture threshold indicates the puncture signalling and the AL is equal to or less than the puncture threshold, or the puncture threshold indicates the superposition signalling and the AL is greater than the puncture threshold, wherein the puncture threshold is configured by higher layer signalling. Element 7: wherein the puncture threshold indicates that the NR PDCCH is not received when overlapped by the LTE CRS and the AL is equal to or less than the puncture threshold, where the apparatus does not support puncture signalling. Element 8: wherein the puncture threshold specifies a DMRS to LTE CRS collision parameter, where the DMRS to LTE CRS collision parameter specifies a range of relative power levels where a PDCCH DMRS RE collides with the LTE CRS. Element 9: receive a capability parameter of the UE, wherein the capability parameter indicates whether the UE supports puncture signalling of the LTE CRS with the NR PDCCH. Element 10: wherein the apparatus determines an AL to be used for the NR PDCCH by using the capability parameter. Element 11: wherein the puncture threshold specifies one of a superposition signalling or a puncture signalling of the NR PDCCH with the LTE CRS. Element 12: wherein a power level utilized by the NR PDCCH is adjusted utilizing one or more of a performance parameter determined based on previous signals received from the UE, or a load of the apparatus. Element 13: wherein the NR PDCCH includes the puncture threshold to be utilized with a specified NR PDCCH relative power level, wherein the puncture threshold is utilized by the UE with a subsequent NR PDCCH. Element 14: wherein the UE does not utilize blind decoding when one of the UE does not support a puncture signalling scheme, the UE is not configured to utilize the puncture signalling scheme, or the NR PDCCH does not use the puncture signalling scheme. Element 15: specifying a NR PDCCH relative power level in the puncture threshold, wherein the NR PDCCH relative power level indicates the NR PDCCH is at a higher power level than the LTE CRS, at a lower power level than the LTE CRS, or at an equal power level to that of the LTE CRS, and the UE utilizes the NR PDCCH relative power level to decode the NR PDDCH. Element 16: decoding, at the UE, the NR PDCCH and the LTE CRS utilizing one or more of the puncture threshold received in a previous signal where the puncture threshold includes a NR PDCCH relative power level, a puncture signalling when the AL is equal to or less than the puncture threshold, or a superposition signalling when the AL is greater than the puncture threshold. Element 17: wherein the network node is one of a gNB, an UMTS, a E-UTRA, an eNB, an en-gNB, or a ng-eNB.

What is claimed is:

1. An apparatus, comprising:
   one or more processors; and
   memory storing instructions and data that, when executed by the one or more processors, cause the apparatus to:
      receive one or more of a cell-specific reference signal (CRS) of a first radio access technology (RAT) or a physical downlink control channel (PDCCH) of a second RAT from a network node; and
      decode the PDCCH of the second RAT utilizing a puncture threshold and an aggregation level (AL), where the puncture threshold indicates one or more of a puncture signalling, a superposition signalling, or the PDCCH of the second RAT relative power level, wherein, when the PDCCH of the second RAT relative power level is used, the PDCCH of the second RAT relative power level is received in a previous signal.

2. The apparatus as recited in claim 1, wherein the apparatus is caused to perform PDCCH of the second RAT skipping for the PDCCH of the second RAT with the AL indicated as using the puncture signalling when the PDCCH of the second RAT overlaps with the CRS of the first RAT and the apparatus does not support puncture signalling.

3. The apparatus as recited in claim 1, further caused to:
   transmit a capability parameter to the network node prior to receiving the one or more of the CRS of the first RAT or the PDCCH of the second RAT, wherein the capability parameter includes one or more parameters to decode signals using relative power levels; and
   receive the puncture threshold prior to receiving the PDCCH of the second RAT, wherein the PDCCH of the second RAT relative power level indicates the PDCCH of the second RAT is at a higher power level than the CRS of the first RAT, at a lower power level than the CRS of the first RAT, or at an equal power level to that of the CRS of the first RAT, and the PDCCH of the second RAT relative power level is utilized to decode the PDCCH of the second RAT.

4. The apparatus as recited in claim 3, wherein the PDCCH of the second RAT relative power level is in a specified decibel (dB) range.

5. The apparatus as recited in claim 3, wherein the puncture threshold utilizes the PDCCH of the second RAT relative power level and the superposition signalling, where the AL is equal to or less than the puncture threshold.

6. The apparatus as recited in claim 1, wherein the puncture threshold indicates the puncture signalling and the AL is equal to or less than the puncture threshold, or the puncture threshold indicates the superposition signalling and the AL is greater than the puncture threshold, wherein the puncture threshold is configured by higher layer signalling.

7. The apparatus as recited in claim 1, wherein the puncture threshold indicates that the PDCCH of the second RAT is not received when overlapped by the CRS of the first RAT and the AL is equal to or less than the puncture threshold, where the apparatus does not support puncture signalling.

8. The apparatus as recited in claim 1, wherein the puncture threshold specifies a demodulation reference signal (DMRS) to CRS of the first RAT collision parameter, where the DMRS to CRS of the first RAT collision parameter specifies a range of relative power levels where a PDCCH DMRS resource element (RE) collides with the CRS of the first RAT.

9. An apparatus, comprising:
   one or more processors; and
   memory storing instructions and data that, when executed by the one or more processors, cause the apparatus to:
      determine a puncture threshold of a physical downlink control channel (PDCCH) of a second radio access technology (RAT) to a user equipment (UE), wherein the puncture threshold includes an aggregation level (AL) for the PDCCH of the second RAT, for when the apparatus is scheduled to transmit cell-specific reference signal (CRS) of a first RAT within a same orthogonal frequency-division multiplexing (OFDM) symbol and a same frequency domain resource element as the PDCCH of the second RAT; and transmit the PDCCH of the second RAT to the UE, wherein the PDCCH of the second RAT is composed using the puncture threshold.

10. The apparatus as recited in claim 9, further caused to:
receive a capability parameter of the UE, wherein the capability parameter indicates whether the UE supports puncture signalling of the CRS of the first RAT with the PDCCH of the second RAT.

11. The apparatus as recited in claim 10, wherein the apparatus is caused to determine an AL to be used for the PDCCH of the second RAT by using the capability parameter.

12. The apparatus as recited in claim 9, wherein the puncture threshold specifies one of a superposition signalling or a puncture signalling of the PDCCH of the second RAT with the CRS of the first RAT.

13. The apparatus as recited in claim 9, wherein a power level utilized by the PDCCH of the second RAT is adjusted utilizing one or more of a performance parameter determined based on previous signals received from the UE, or a load of the apparatus.

14. The apparatus as recited in claim 9, wherein the PDCCH of the second RAT includes the puncture threshold to be utilized with a specified PDCCH of the second RAT relative power level, wherein the puncture threshold is utilized by the UE with a subsequent PDCCH of the second RAT.

15. A method, comprising:
receiving a capability parameter of a user equipment (UE), wherein the capability parameter indicates whether the UE supports puncture signalling of a cell-specific reference signal (CRS) of a first radio access technology (RAT) with a physical downlink control channel (PDCCH) of a second RAT;
determining a puncture threshold of the PDCCH of the second RAT utilizing the capability parameter, wherein the puncture threshold includes an aggregation level (AL) for the PDCCH, and the CRS of the first RAT is scheduled to be transmitted within a same orthogonal frequency-division multiplexing (OFDM) symbol and a same frequency domain resource element as the PDCCH of the second RAT; and
transmitting one or more of the CRS of the first RAT or the PDCCH of the second RAT to the UE using the puncture threshold.

16. The method as recited in claim 15, wherein the UE does not utilize blind decoding when one of the UE does not support a puncture signalling scheme, the UE is not configured to utilize the puncture signalling scheme, or the PDCCH of the second RAT does not use the puncture signalling scheme.

17. The method as recited in claim 15, specifying a PDCCH of the second RAT relative power level in the puncture threshold, wherein the PDCCH of the second RAT relative power level indicates the PDCCH of the second RAT is at a higher power level than the CRS of the first RAT, at a lower power level than the CRS of the first RAT, or at an equal power level to that of the CRS of the first RAT, and the PDCCH of the second RAT relative power level is usable to decode the PDCCH of the second RAT.

18. The method as recited in claim 15, decoding, at the UE, the PDCCH of the second RAT and the CRS of the first RAT utilizing one or more of the puncture threshold received in a previous signal where the puncture threshold includes a PDCCH of the second RAT relative power level, a puncture signalling when the AL is equal to or less than the puncture threshold, or a superposition signalling when the AL is greater than the puncture threshold.

19. A communication system, comprising:
a network node, capable to transceive communications with one or more user equipment (UEs), wherein the communications include a cell-specific reference signal (CRS) of a first radio access technology (RAT) and a physical downlink control channel (PDCCH) of a second RAT, and the CRS of the first RAT and the PDCCH of the second RAT are transmitted using one of a puncture signalling, superposition signalling, or drop signalling, where the CRS of the first RAT is transmitted within a same orthogonal frequency-division multiplexing (OFDM) symbol and a same frequency domain resource element as the PDCCH of the second RAT; and
a UE, in the one or more UEs, capable to transceive the communications with the network node, wherein the UE transmits a capability parameter to the network node, the UE receives a puncture threshold from the network node, and the UE processes the CRS of the first RAT and decodes the PDCCH of the second RAT using the puncture threshold.

20. The communication system as recited in claim 19, wherein the network node is one of a 5G base station (gNB), an evolved universal mobile telecommunications system (UMTS), a terrestrial radio access (E-UTRA), an enhanced 4G eNodeB E-UTRA base station (eNB), an enhanced gNB (en-gNB), or a next generation eNB (ng-eNB).

* * * * *